(12) United States Patent
Cheng et al.

(10) Patent No.: US 7,500,399 B2
(45) Date of Patent: Mar. 10, 2009

(54) PIEZORESISTIVE STRAIN GAUGE USING DOPED POLYMERIC FLUID

(75) Inventors: Ching Hsiang Cheng, Hong Kong (CN); Chen Chao, Hong Kong (CN); Yin Nee Cheung, Hong Kong (CN)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 11/822,042

(22) Filed: Jul. 2, 2007

(65) Prior Publication Data

US 2009/0007685 A1    Jan. 8, 2009

(51) Int. Cl.
*G01B 7/16* (2006.01)
(52) U.S. Cl. ......................................... 73/777

(58) Field of Classification Search .................... 73/777
See application file for complete search history.

(56) References Cited

U.S. PATENT DOCUMENTS

| 3,719,913 | A |  | 3/1973 | DuBose et al. |
| 4,506,250 | A |  | 3/1985 | Kirby |
| 4,708,019 | A |  | 11/1987 | Ruber et al. |
| 6,042,710 | A | * | 3/2000 | Dubrow ...................... 204/454 |
| 6,248,852 | B1 | * | 6/2001 | Risen et al. .................... 528/9 |
| 7,005,050 | B2 | * | 2/2006 | Burns et al. ................. 204/453 |

* cited by examiner

*Primary Examiner*—Max Noori
(74) *Attorney, Agent, or Firm*—Stephen M. De Klerk; Sonnenschein, Nath & Rosenthal, LLP

(57) ABSTRACT

The present invention relates to a strain gauge and methods of making such wherein the gauge contains a doped polymeric fluid suitable for measuring elongations of more than 10%.

9 Claims, 4 Drawing Sheets

US 7,500,399 B2

PIEZORESISTIVE STRAIN GAUGE USING DOPED POLYMERIC FLUID

BACKGROUND

A strain gauge, or gage, is a device for measuring dimensional change primarily on the surface of a specimen as the latter is subjected to mechanical, thermal, or a combination of both stresses. One type of strain gauge is attached to the specimen surface and amplifies mechanically the surface distortion so that the change can be measured on an indicator.

In measuring biological fluids flows, Whitney (1953) first introduced mercury-in-rubber strain gauge plethysmography for the measurement of changes in tissue volume occurring in response to venous occlusion. In use, this strain gauge was placed under tension around the limb under investigation. While effective, this strain gauge is environmentally harmful as it contains mercury, leading to disposal problems.

It is an object of the present system to provide a strain gauge for measuring objects capable of a large deformation, while being environmentally safe.

DESCRIPTION

The present invention proposes a strain gauge possessing a doped polymeric fluid, wherein the strain gauge is capable of deformation measurements greater than 10%, while being environmentally safe.

These and other features, aspects, and advantages of the apparatus and methods of the present invention will become better understood from the following description, appended claims, and accompanying drawings where:

Figure 4:
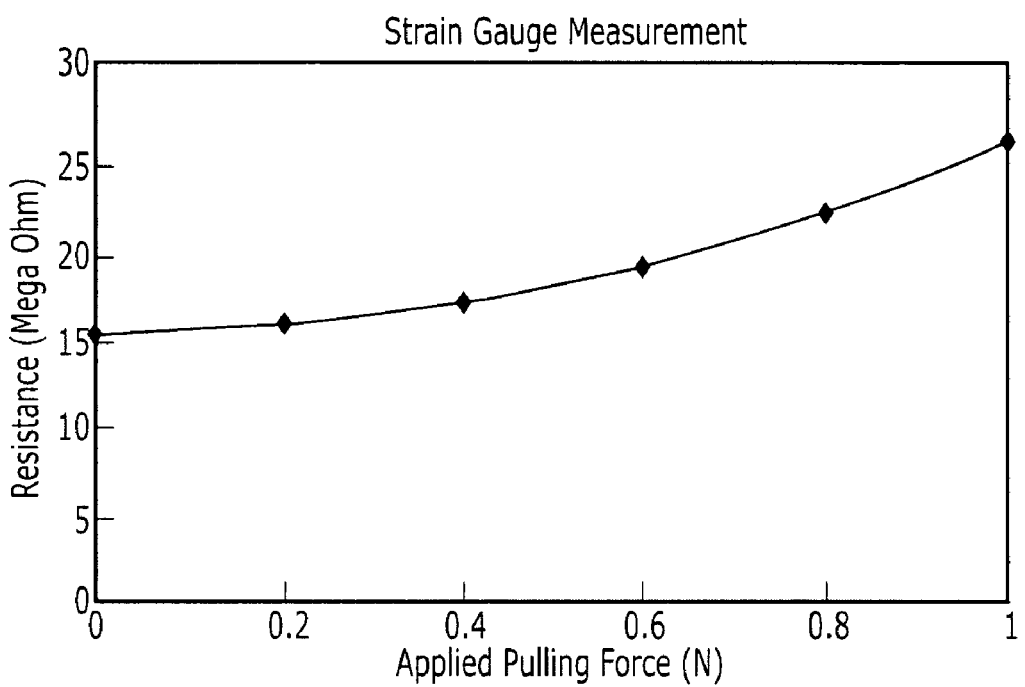

FIG. 4 graphs the measured resistance versus the pulling force of the strain gauge.

FIG. 5 exhibits a method of making the strain gauge of the present invention.

The following description of certain exemplary embodiment(s) is merely exemplary in nature and is in no way intended to limit the invention, its application, or uses.

Now, to FIGS. 1-5,

The present invention relates to a strain gauge containing an electrically conductive fluid and a method of making such strain gauge. Through the present invention, it is possible to obtain a strain gauge capable of measuring objects with a large deformation, defined as more than 10%. Thus, the present invention is an improvement over prior art strain gauge, including metal-wire strain gauges and mercury based strain gauge, which are not able to measure large deformation or are environmentally harmful.

Figure 1:
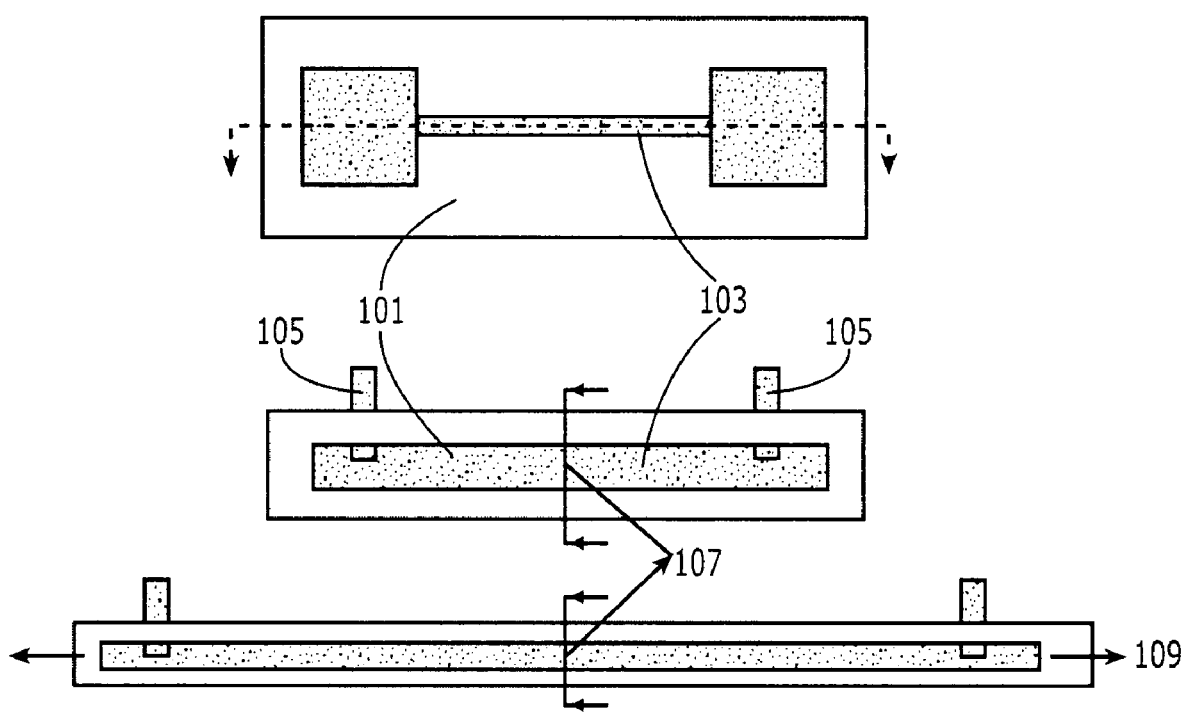
FIG. 1 shows an embodiment of a strain gauge of the present invention.

FIG. 1 is an embodiment of a strain gauge according to the present invention, such apparatus having as components polymer channel 101, a doped polymeric fluid 103, and electrodes 105 for connecting to a measuring device.

The polymer channel 101 can be made of materials suitable for operating over a wide temperature range, for example −195° C. to 200° C., and elongations over 10%. Examples of suitable materials for the polymer channel 101 include elastomers, such as those derived from acrylates, butyls, fluorocarbons, fluorosilicones, sulfides, urethanes, neoprenes, isoprenes, nitrites, silicones, butadienes, and styrene butadienes. Resins may also be suitable materials, for example epoxy resins, phenolic resins, and polyimides. The polymer channel 101 can also be doped, for example with glass fibre, to positively affect the properties of channel 101.

The doped polymeric fluid 103 is made from a nonconducting polymeric fluid mixed with a conductive powder. In one embodiment, the nonconductive fluid is a silicon compound, generally of the formula $[R_2SiO]_n$, where R=methyl, ethyl, or phenyl and n represents a repeating # of units. Other nonconductive polymer fluids include castor oil, mined oil, and propylene glycol. The conductive powder should be used to add a conductive element to the nonconductive polymer. Example of the conductive powder is carbon black powder, or a metal. The weight/volume ratio of nonconductive polymer to carbon black powder can be from 0.5:1 to 1:3.

The trench 107 for holding the doped polymeric fluid 103 can have a volume of about 1 µL and above. In one embodiment, the dimensions measure, 2 mm(depth)×5 mm(width) ×20 mm(length).

Figure 2:
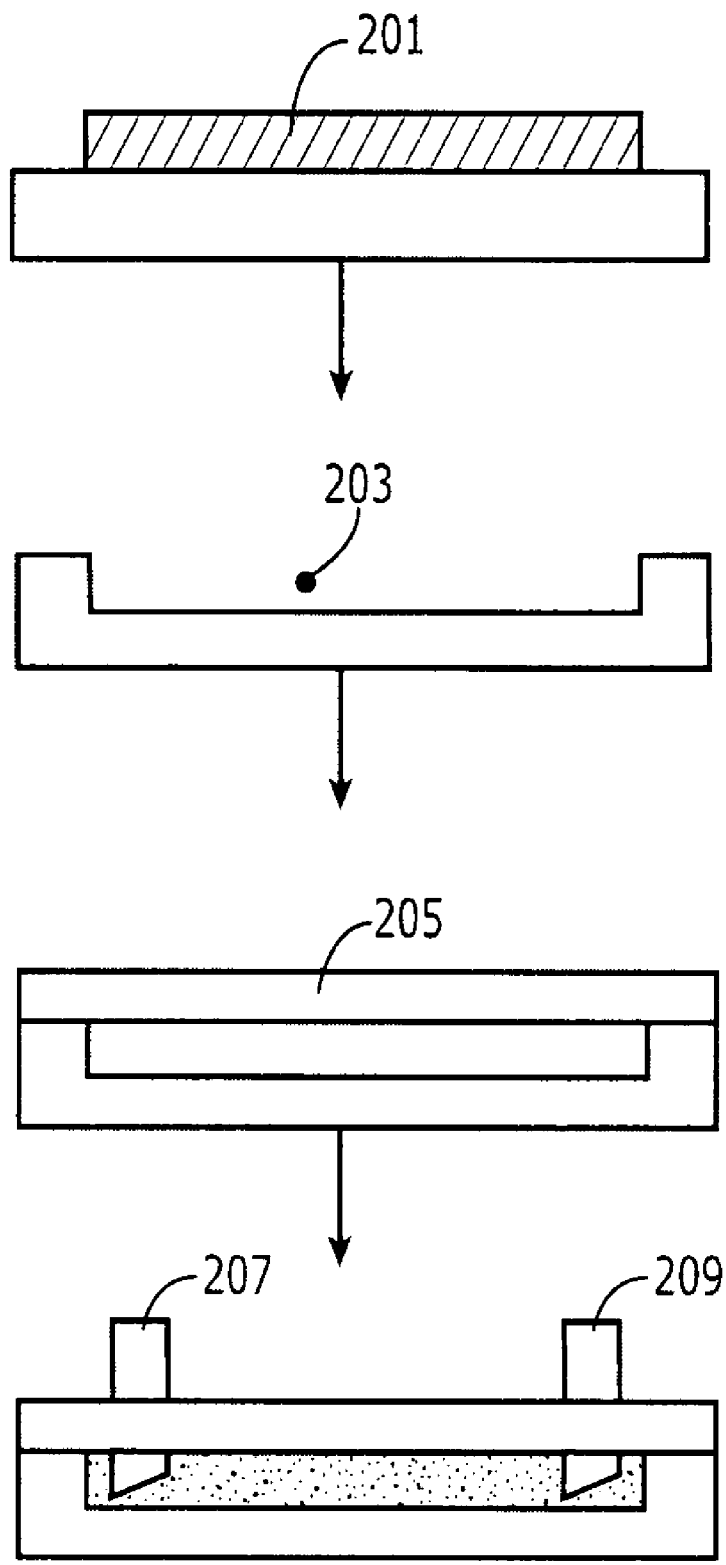
FIG. 2 shows the method of making strain gauges of the present invention.

In use, the sides of the strain gauge are engaged and pulled in opposite directions 109. The electrodes 105 transmit electrical signals via connected wires (not shown) to a measurement system (not shown). The measurement system measures electrical resistance changes due to the deformation of the strain gauge. Because of the construction of the present strain gauge, measurement of objects with deformations larger than 10% can be made. When a pulling force is applied to the strain gauge, the length of the gauge is increased and the cross-sectional area of the gauge is reduced. The electrical resistance is represented by the following relationship, Resistance=Resistivity×Length/Cross-sectional Area FIG. 2 is an embodiment of making the strain gauge of the present invention.

First, a polymer channel is fabricated in a silicon substrate 201 to define a trench 203. In fabrication, a film coating such as a photoresist is utilized. Such photoresist is preferably a negative photoresist, which pertains to coating larger portions that are exposed to activating radiation polymerize or crosslinking in a relation between a photo active compound and polymerizable reagents of the photoresist composition.

U.S. Pat. No. 7,211,365, incorporated herein by reference, discusses suitable photoresist coatings suitable for use herein. In one embodiment, SU-8 photoresist is used in fabrication.

In another embodiment, microfabrication techniques, such as etching and thin film deposition, are used to define the trench 203.

The defined trench 203, as previously stated, can have a volume of about 1 µL and above. In a preferred design, the length of the trench is the largest measurement, being between 80 to 300 times larger than the depth of the trench.

The trench is then air-sealed with a polymer cover 205. The size of polymer cover is preferably equal to the depth and length of the strain gauge.

The conducting fluid, as previously discussed, is then inserted into the sealed trench. Inserting the conducting fluid occurs by injecting, preferably via syringe, the fluid on one side of the strain gauge 209. However, prior to injection, a venting hole is made on another side of the strain gauge 207. Electrodes such as wires are then inserted in both holes previously made. The wires are sealed into place and the holes are sealed by a filler, such as an epoxy.

Figure 3:
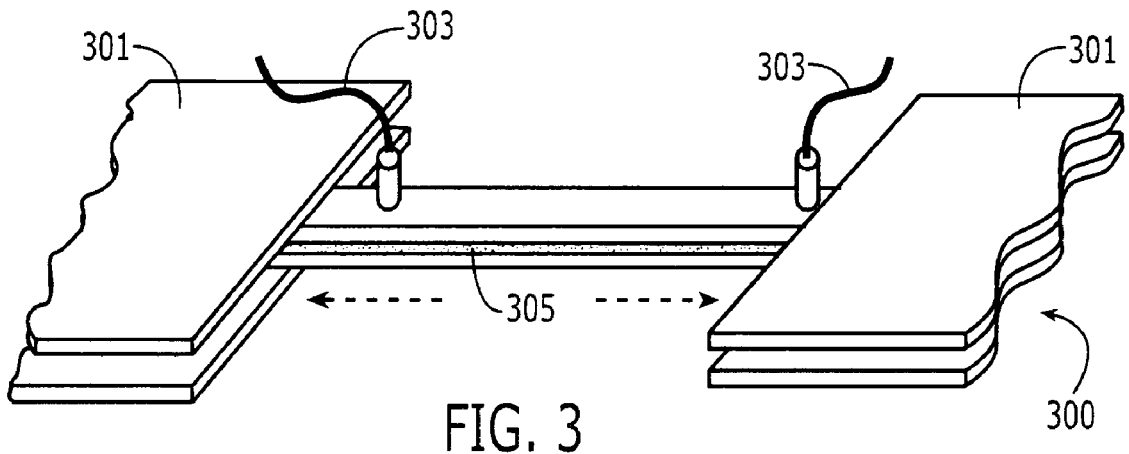
FIG. 3 shows the strain gauge in attachment with pulling forces.

FIG. 3 is an embodiment of the doped polymeric strain gauge 300 of the present invention as connected to pulling forces. The doped polymeric strain gauge 300 includes the components wired electrodes 303, doped polymeric fluid 305, and connected to pulling forces 301 for pulling the strain gauge 300 along a linear direction. In use, the strain gauge 300 is stretched in two opposite directions; the body of the doped polymeric fluid 305 becomes larger and thinner. The resistance through the stain gauge 300, as determined by the electrodes 303, is thus increased. Through an appropriately connected circuit, the resistance is amplified and recorded, preferably by a galvanometer. It is preferably possible to amplify the resistance changes such that a minimal change in the length of the gauge will produce a deflection of the galvanometer stylus. It is thus possible to detect and record small changes.

In one example, the strain gauge can be used to measure biological fluid flow. This can be obtained by positioning the strain gauge under tension around a limb under investigation. The electrical resistance of the strain gauge changes in proportion to alteration of the limb circumference. A balanced wheatstone's bridge, with one arm formed by the gauge, gives an out-of-balance voltage that is proportional to changes in limb circumference. The electrodes are connected to a galvanometer for measuring. Through the present invention, measurement of more than 10% elongation of the strain gauge, without breakage, is possible.

The pulling forces can be applied on both sides of the strain gauge. In one embodiment, pulling forces can be a string wrapped on both sides of the strain gauges. In another embodiment, the strain gauge can be mounted to a surface by bottom adhesion, in such an embodiment the adhesion serves to transmit any deformation/stress to the strain gauge.

FIG. 4 shows the electrical resistance varies with the applying force. As shown, the non-linearity is coming from the second-order term of the increasing gauge length that cannot be ignored due to the large deformation.

EXAMPLE

A strain gauge of the present invention was fabricated using two layers of polydimethylsiloxane (PDMS) films to encapsulate conductive silicone oil together with the metal electrodes. The PDMS (Dow Corning Sylgard 184) was prepared with 1:10 mixing ratio of curing agent to elastomer base. First, a silicon wafer was coated with a thin layer of PDMS mixture and degassed in the vacuum chamber for 15 min. It was then cured in an oven at 70° C. for 1 hour. The thickness of the PDMS was measured to be around 500 µm. The conductive silicone oil was prepared by mixing 10 to 30% weight portion of the CDX-7055 Ultra (Columbian Chemicals, Co.) carbon black powder or carbon nanotube to the silicone oil. A pair of metal wires was first attached on the side of the silicon wafer for making electrodes as contacts to the gauge material. The conductive silicone oil was screen or stamp printed on top of the PDMS film with a pre-shaped PDMS film with designed opening. It was followed with 15 min of degas in the vacuum chamber. A layer of PDMS mixture was poured on top of the conductive silicone oil, degassed, and cured to become solidified to cover the gauge material. The liquid conductive silicone oil was encapsulated in the PDMS microchannel at this step. The completed strain gauge was then removed from the silicon substrate.

Figure 5A:
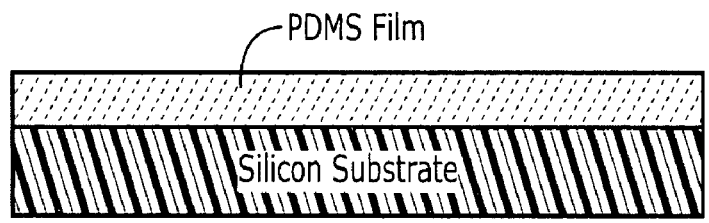
Figure 5B:
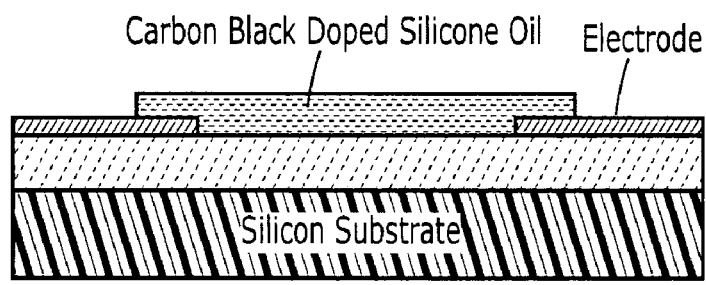
Figure 5C:
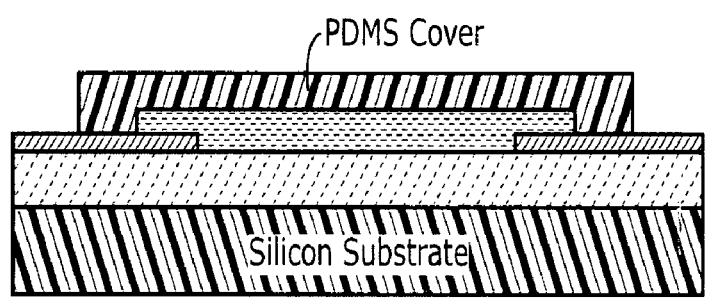
Figure 5D:
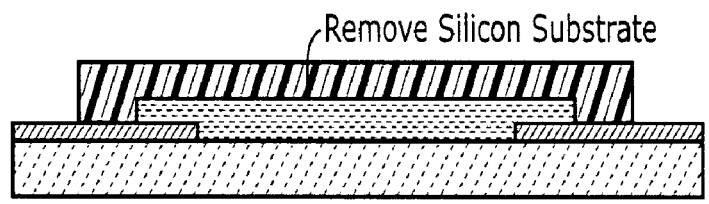

FIG. 5 shows the method of making the strain gauge of the above example, whereby a layer of PDMS is coated and cured on the silicon substrate at 70° C. for 1 hour (FIG. 5(a)), a pair of metal pods is attached to the ends of the PDMS film, followed by screen printing a strip of carbon black doped silicone oil (FIG. 5(b)), a second PDMS film is coated to cover the carbon black doped silicone oil with metal exposed for electrical contact followed by curing at 70° C. for 1 hour, (FIG. 5(c)), and the strain gauge is removed from the silicon substrate (FIG. 5(d)).

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A strain gauge suitable for measuring elongations of more than 10%, comprising:
   a polymer channel in a silicon substrate, wherein said polymer channel is selected from the group consisting of acrylates, butyls, fluorocarbons, fluorosilicones, sulfides, butadienes, styrene butadienes, and resin;
   a doped polymeric fluid inserted in said channel, wherein said fluid is comprised of a nonconductive fluid and a conductive powder; and
   electrodes on either side of said polymer channel.

2. A strain gauge suitable for measuring elongations of more than 10% of claim 1, wherein said nonconductive fluid is of the formula $[R_2SiO]_n$, where R=methyl, ethyl, or phenyl.

3. A strain gauge suitable for measuring elongations of more than 10% of claim 1, wherein said conductive powder can be selected from the group consisting of carbon black powder or metal powder.

4. A strain gauge suitable for measuring elongations of more than 10% of claim 1, wherein said nonconductive fluid and said conductive powder are mixed in a weight/volume ratio of between 0.5:1 to 1:3.

5. A strain gauge suitable for measuring elongations of more than 10% of claim 1, further comprising a trench having a volume of about 1 µL and above.

6. A method of making a strain gauge for measuring elongations of more than 10%, comprising the steps of;
   fabricating a polymer channel to define a trench utilizing a negative photoresist coating;
   air-sealing said trench;
   inserting a venting hole in said polymer channel;
   injecting a doped polymeric fluid;
   inserting electrodes in the vent hole and injection hole; and
   sealing said hole.

7. A method of making a strain gauge for measuring elongations of more than 10%, comprising the steps of
   coating an elastomer substrate with Polydimethyl siloxane;
   attaching electrodes to the ends of said Polydimethyl siloxane;
   depositing a gauge material on said substrate;
   covering said gauge material with a second polydimethyl siloxane; and
   curing said second polydimethyl siloxane.

8. The method of making a strain gauge for measuring elongations of more than 10% of claim 7, wherein depositing said gauge material is performed by stamping.

9. The method of making a strain gauge for measuring elongations of more than 10% of claim 7, wherein said gauge material is doped conductive polymeric fluid.

* * * * *